(12) United States Patent
Schuseil et al.

(10) Patent No.: US 8,267,822 B2
(45) Date of Patent: Sep. 18, 2012

(54) WRAP-AROUND DRIVE

(75) Inventors: Bolko Schuseil, Adelsdorf (DE);
Michael Bogner, Eckental (DE);
Roman Kern, Forchheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 104 days.

(21) Appl. No.: 12/939,293

(22) Filed: Nov. 4, 2010

(65) Prior Publication Data

US 2011/0053719 A1 Mar. 3, 2011

Related U.S. Application Data

(62) Division of application No. 11/995,873, filed as application No. PCT/EP2006/006295 on Jun. 29, 2006.

(30) Foreign Application Priority Data

Jul. 16, 2005 (DE) .......................... 10 2005 033 322

(51) Int. Cl.
*F16H 7/18* (2006.01)
(52) U.S. Cl. ....................................... 474/140; 474/101
(58) Field of Classification Search ................... 474/134, 474/111, 137, 148, 150, 144, 101, 110, 112, 474/113, 133, 136, 140, 146, 147
See application file for complete search history.

(56) References Cited

U.S. PATENT DOCUMENTS

| 3,888,217 | A |   | 6/1975 | Hisserich |
|---|---|---|---|---|
| 5,797,818 | A | * | 8/1998 | Young ........................... 474/111 |
| 5,967,922 | A | * | 10/1999 | Ullein et al. ................... 474/111 |
| 6,050,914 | A |   | 4/2000 | Shimaya et al. |
| 6,358,169 | B1 |   | 3/2002 | Markley |
| 6,375,587 | B1 |   | 4/2002 | Wigsten |
| 7,686,718 | B2 |   | 3/2010 | Nakano et al. |

FOREIGN PATENT DOCUMENTS

| DE | 3328677 | 2/1985 |
|---|---|---|
| DE | 3939821 | 6/1991 |
| DE | 29905965 | 9/1992 |
| DE | 4320272 | 12/1993 |
| DE | 4243331 | 6/1994 |
| DE | 4337827 | 5/1995 |
| DE | 19536643 | 4/1997 |
| DE | 19616081 | 1/1998 |
| DE | 19908287 | 9/2000 |
| DE | 19923923 | 12/2000 |

(Continued)

*Primary Examiner* — Michael Mansen
*Assistant Examiner* — Juan Campos, Jr.
(74) *Attorney, Agent, or Firm* — Volpe and Koenig, P.C.

(57) ABSTRACT

A belt drive is provided which includes a circulating belt (8) which is driven by at least one drive element (9) and which drives at least one driven element (10). At least one first tensioning device (20) acts upon the belt (8) in the slack strand and at least one second tensioning device acts in the tightened strand. To prevent or reduce jumps and/or transverse oscillations of the belt (8), the second device (21) guides the belt (8) and at least one third device (22) which is arranged radially inside the belt drive, which is suitable, optionally, limits deviations of the belt (8). The second device (30, 40, 50, 60, 70, 80, 90, 100) also tensions the belt (8) in such a manner that it is subjected to a force (F1) which is smaller than the force (F2) which is oriented counter thereto during the operation of the belt (8) on the second tensioning device (30, 40, 50, 60, 70, 80, 90, 100).

6 Claims, 6 Drawing Sheets

FOREIGN PATENT DOCUMENTS

| | | |
|---|---|---|
| DE | 10247419 | 4/2004 |
| DE | 10348878 | 5/2004 |
| EP | 1262685 | 12/2002 |
| JP | 09004686 | 1/1997 |

* cited by examiner

WRAP-AROUND DRIVE

CROSS-REFERENCE TO RELATED APPLICATIONS

This application is a divisional of U.S. patent application Ser. No. 11/995,873, filed Feb. 4, 2008, which was a 371 national phase of PCT/EP2006/006295, filed Jun. 29, 2006, which claims the benefit of German Patent Application No. 10 2005 033 322.2, filed Jul. 16, 2005, all of which are incorporated herein by reference as if fully set forth.

BACKGROUND

The invention relates to a wrap-around drive comprising a circulating belt means, which is driven by at least one drive element and which drives at least one driven element, as well as at least one first tensioning device acting on the belt means in a region of the wrap-around drive, in which this belt means leaves the drive element in the circulating direction and reaches the closest driven element, and at least one second device in a region of the wrap-around drive, in which the belt means reaches the drive element in its circulating direction and leaves the closest driven element.

Such wrap-around drives are used, for example, for timing and/or accessory drives in internal combustion engines. The traction means, for example, the timing belt, is here driven by a driving gear mounted on a crankshaft of the engine and drives driven gears, which are connected to timing shafts or camshafts of the engine. For limiting transverse vibrations in the timing belt, this belt is led over a guide on its tensioned side running into the driving gear and a force tensioning the belt is applied by a tensioning device to the slack side of the belt running out from the driving gear.

EP 1 262 685 also shows a wrap-around drive according to the class, in which for limiting transverse vibrations of a timing belt, a force is applied to this belt both on its tensioned side running into the driving gear and also on its slack side running out from the driving gear. The forces are set here by a rotating, adjustable ring body, to which guide rails are attached that act on the timing belt. The tensioning force acting on the timing belt increases or decreases with the degree of rotation of the ring body. The rotation of the ring body itself is generated by a combination of oil pressure and spring force.

DE 196 16 081 C1 shows a wrap-around drive comprised of belt disks and an endless belt with a device for steadying belt vibrations, in which a guide plate is arranged fixed at a close distance to the belt for reducing belt vibrations in a corresponding critical region.

Limiting transverse vibrations in wrap-around drives is of great importance with respect to their functionality, service life, and noise output. This applies independent of how many driving and driven gears are actually used for a wrap-around drive. The belt means can involve, for example, a chain or a toothed belt of a timing drive, which synchronizes crankshafts and camshafts with each other, or, for example, also a driving belt, which connects a belt disk of a drive shaft to the belt disk of a driven shaft for some assembly in a driving manner.

For transverse vibrations that become too large, adjacent components can be damaged, if a toothed belt or a chain temporarily loses positive-fit contact with a driving or also driven element due to transverse vibrations that are too large. Furthermore, unsuitably high mechanical loads for the belt means itself can occur due to excessive transverse vibrations, which lead to a shortened service life of the belt means. In addition, excessive transverse vibrations cause a comparatively high noise generation.

Finally, synchronization errors between at least two camshafts and/or between these and the crankshaft of an internal combustion engine can occur, when the wrap-around drive is lengthened due to wear and a tensioning device on a belt means strand compensates this by an increased tensioning path. Because this single tensioning device is typically activated by an actuator acted upon by the oil pressure of the internal combustion engine, in particular, at the start of the internal combustion engine, insufficient oil pressure is present in the actuator, so that disadvantageously, tooth jumping is hard to prevent in known wrap-around drives.

To be noted is also the increasing complexity of accessories for usually only limited space relationships in the region of the wrap-around drive, as well as the necessary flexibility of the wrap-around drive due to the increasing number of different accessories with respect to adaptability to different operating conditions.

SUMMARY

The invention is based on the objective of creating a wrap-around drive, in which tooth jumping caused by wear-related lengthening of the belt means between the belt means and the driving element or driven element can be prevented reliably and also at least the amplitude of transverse vibrations of the belt means can be reduced.

The invention is based on the knowledge that through selective improvement of the wrap-around drive layout or wrap-around drive construction, transverse vibrations of the belt means can be reduced and also tooth jumping can be prevented. Here, the important feature is that a special means is provided and arranged on the wrap-around drive for preventing loosening of the belt means due to decreasing force application by the actuator-controlled tensioning device, which would hold back the belt means before the drive element of the wrap-around drive and would lift the belt means from this drive.

The invention starts from a wrap-around drive, comprising a circulating belt means, which is driven by at least one drive element and which drives at least one driven element, as well as at least one first tensioning device acting on the belt means in a region of the wrap-around drive, in which the belt means leaves the drive element in its circulating direction and reaches the closest driven element, and at least one second device in a region of the wrap-around drive, in which the belt means reaches the drive element in its circulating direction and leaves the closes driven element.

In this wrap-around drive, according to the invention it is also provided that the second device provided at least once in this drive is constructed for guiding the belt means and at least one third device arranged in the radial direction within the wrap-around drive is provided, which is also suitable for limiting excursions of the belt means.

Such a wrap-around drive can be a timing drive of an internal combustion engine in the form of a toothed-belt drive or a chain drive, but it can also be constructed as a toothed-belt drive or chain drive for driving auxiliary accessories.

Through this construction, it is advantageously achieved that a belt means lengthened due to wear past its original installed dimensions cannot lift from the drive element of the wrap-around drive so that it jumps out of the teeth or it cannot be held back in front of this drive element, when the contact force of an allocated tensioning device that can be activated by a pressurized medium is not yet or no longer present due to operation. In addition, with a belt or chain drive built structurally according to the invention, the likelihood and the extent of the appearance of transverse vibrations of the belt means can be reduced.

The third device arranged in the radial direction within the wrap-around drive is suitable for this purpose and also provided to produce a steering effect on the inside of the belt means not reached by the other devices and, if necessary, is arranged where this appears most relevant to someone skilled in the art for fulfilling this purpose.

Preferably, it is provided that the third device provided at least once in the wrap-around drive is arranged in the region of the drive element, for example, a crankshaft drive wheel, by means of which, in this usually critical region, an additional avoidance or prevention of undesired vibrations and tooth jumping is advantageously enabled.

If the third device present at least once in the wrap-around drive is arranged in the region of the drive element, in which the belt means has reached the drive element in its circulating direction or is arranged in the region of the drive element, in which the belt means leaves the drive element in its circulating direction, then a positive effect on the vibrating behavior of the belt means, as well as a given run-in and run-out angle and a given advantageous contact length of the belt means on the drive element, can be realized on these sections of the belt means located in the direct area of the drive element, In this connection, it is especially useful if, in the construction of the invention, the third device present at least once in the wrap-around drive is suitable for acting both in the region of the drive element, in which the belt means reaches the drive element in its circulating direction and also in the region of the drive element, in which the belt means leaves the drive element in its circulating direction.

The third device present at least once in the wrap-around drive here does not necessarily have to be constructed as guide means for the belt means. That is, it does not have to be in constant contact with the belt means, but instead it is absolutely advantageous when this is arranged at a defined distance from the inside of the belt means. In this way, this occurs only for actually appearing undesired transverse vibrations and/or holding back of the belt means in the slack belt strand, which leads, as a whole, to a reduction in friction on this third device.

In addition, it can be advantageously provided that the third device present at least once in the wrap-around drive is connected mechanically to the first tensioning device present at least once in the wrap-around drive and/or to the second guide device present at least once in the wrap-around drive. In this way, the devices connected to each other can be aligned in common and adjusted easily.

If at least one of the mentioned devices is advantageously provided with a surface reducing the friction with the belt means, this can lead to further friction reduction and thus an increase in the service life of the belt means.

Alternatively, according to the invention a wrap-around drive can be created, comprising a circulating belt means, which is driven by at least one drive element and which drives at least one driven element, as well as at least one first tensioning device acting on the belt means in a region of the wrap-around drive, in which the belt means leaves the drive element in its circulating direction and reaches the closest driven element, and at least one second device in a region of the wrap-around drive, in which the belt means reaches the drive element in its circulating direction and leaves the closest driven element.

According to the invention, it is also provided that the second device present at least once in the wrap-around drive is also constructed for tensioning the belt means, such that this means acts on the belt means with such a force F1 that is smaller than an opposite force F2 acting on the second tensioning device in the operation of the belt means. This opposite force F2 acting on the second tensioning device is applied by the belt means tensioned by the first tensioning device.

Through this construction, it is achieved that, especially in a standstill phase, in which the first tensioning device operated by pressurized medium does not exert a force tensioning the belt means on the belt means due to the lack of pressure in the pressurized medium, a wear-dependent lengthening of the belt means is compensated in the wrap-around drive, in which this second tensioning device exerts an appropriate tensioning force on the belt means.

Therefore, tooth jumping as well as associated rotational angle errors or synchronous running errors, for example, on a crankshaft disk or on the camshaft disks of an internal combustion engine, can be reliably prevented. In addition, the appearance likelihood and also the amplitude of transverse vibrations of the belt means are further reduced or even completely avoided.

In addition, the second tensioning device can have a more compact construction in its structural design than the first tensioning device that can be activated by pressurized medium and is also suitable for guiding the belt means during its operation along its optimum belt path. Because the force F1 of the second tensioning device acting on the belt means is less than the opposite force F2 acting on the second tensioning device in the operation of the belt means, the force F1 of the second tensioning device has no noticeable effect for the operation of the belt means. However, during a lack of pressurized medium supply to the actuator of the first tensioning device, it is in the position to strongly tension the belt means, so that lengthening of the belt means, for example, caused by wear or by counter rotation of the drive element, is compensated, especially when the belt drive is turned off or after the belt drive has been turned off.

In addition, it can be provided that the force of the second tensioning device acting on the belt means is generated at least partially by a spring force, which allows a structurally simple construction of the device for high reliability. If the spring force is generated by at least one spiral, leaf, or torsion spring, costs can be saved tracing back to common structural elements.

It is absolutely advantageous for the service life of the belt means if the second tensioning device, which is present at least once in the wrap-around drive and which is acted upon by a spring force or which itself has a spring-elastic construction, is provided with a surface reducing the friction. In this way, the size of the spring can be kept smaller and thus space can be saved or the spring possibly could be completely eliminated.

The second tensioning device present at least once in the wrap-around drive can have, in an advantageous refinement of the concept of the invention, a guide body that can move in a direction toward the slack belt strand of the belt means or can have a guide body with a deformable construction. By moving the guide body, a very precise adjustment of this body on the wrap-around drive is possible. The use of a deformable guide body leads to an additional force and supports the spring force of the second tensioning device acting on the belt means, by which a spring provided in the structure can be kept smaller.

In an especially advantageous construction of the invention, it is provided that the first tensioning device present at least once in the wrap-around drive can also be acted upon with a spring force acting on the belt means. In this way, a certain basic tensioning of the belt means on both sides of the drive element is guaranteed, independent of the operating situation of a tensioner of the first tensioning device that can be activated by pressurized medium. Changes in length in the belt means, for example, due to wear or due to counter rotation of the drive element, which can appear, e.g., when a motor is turned off or after the motor has been turned off, can be advantageously compensated.

It is further advantageous when the first tensioning device that can be activated by pressurized medium and that is present at least once in the wrap-around drive and the second tensioning device present at least once are connected to each other elastically by at least one spring. In this way, this spring generates a force acting on the belt means both on the tightened strand and also on the slack strand, so that too much slack in the wrap-around drive is overcome when the drive machine is turned off or when the pressure supply is stopped for the tensioner of the first tensioning device that can be activated by pressurized medium.

Similarly, however, it also offers advantages when the first tensioning device that can be activated by pressurized medium and that is present at least once in the wrap-around drive and the second tensioning device present at least once in the wrap-around drive are connected to each other by a linkage mechanism, wherein the linkage mechanism is connected to at least one spring, which generates a force acting constantly on the belt means.

In a preferred embodiment, it is provided that the guide body of the two tensioning devices are each supported at separate attachment points so that they can pivot, that these guide bodies are connected in articulated ways at other attachment points to a lever-like connection element, that these connection elements are connected to each other so that they can pivot at a connection point, and that at this connection point a spring attaches, such that a basic contact force acts on the belt means through the connection elements and the noted guide bodies.

In addition, it has been judged to be advantageous when the connection elements and the spring of this wrap-around drive are arranged in the radial direction inside of this drive.

Through the above structural features, an equal distribution or different distribution of the basic contact force F1 acting on the belt 8 due to different lever-arm lengths of the connection elements can be achieved.

BRIEF DESCRIPTION OF THE DRAWINGS

The invention will be explained in more detail below with reference to the enclosed drawing using a few embodiments. Shown therein are FIG. 1 a block diagram of a wrap-around drive according to a first solution according to the invention and FIGS. 2 to 9 different schematic diagrams for embodiments of a wrap-around drive according to a second solution according to the invention.

DETAILED DESCRIPTION OF THE PREFERRED EMBODIMENTS

Figure 1:
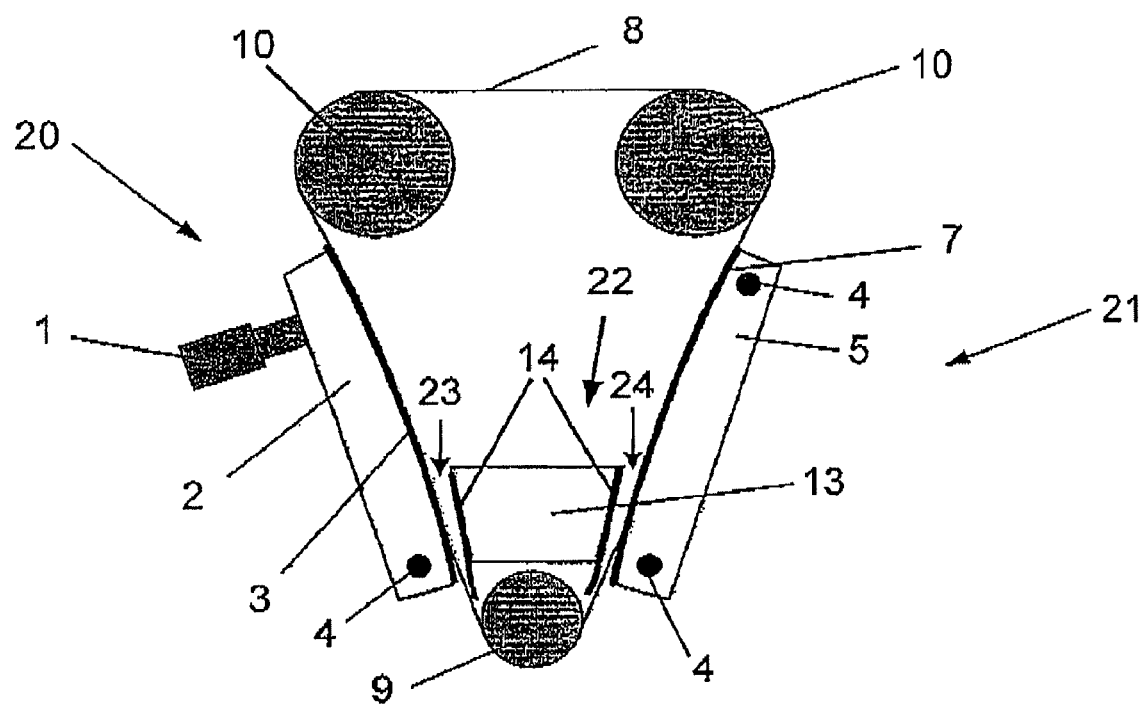

The belt drive shown schematically in FIG. 1 can be used in a motor-vehicle engine and features at the bottom a belt disk 9, which is connected to a not-shown crankshaft and which drives a circulating belt 8 in the clockwise direction. The belt 8 also drives two belt disks 10, which are arranged at the top and which are connected to not-shown camshafts.

The region of the wrap-around drive, in which the belt 8 leaves the driving belt disk 9 in its circulating direction and reaches the closest belt disk 10, it designated in general as the slack strand. The region of the wrap-around drive, in which the belt 8 reaches the driving belt disk 9 in its circulating direction and leaves the closest belt disk 10, is designated in general as the tightened strand.

As FIG. 1 shows, in the slack strand a first tensioning device 20 is provided, which is comprised of a tensioner 1 that can be activated by pressurized medium in the form of a piston-cylinder arrangement, a guide body 2 hinged to an attachment point 4 so that it can pivot, and a friction-reducing sliding coating 3 deposited on the guide body 2 on the belt side. The tensioner 1 applies a force on the guide body 2 of the first tensioning device 20 with a force that presses and thus tensions the belt 8 running over the sliding coating 3 in this diagram to the right in the radial direction approximately in the direction of the center of the wrap-around drive.

In the tightened strand, an additional device 21 is provided for guiding the traction means, which is constructed as a belt 8, and which has a guide body 5 that is mounted at two attachment points 4 and a friction-reducing sliding coating 7 is deposited on this guide body on the belt side. Furthermore, below in the direct area of the belt disk 9, a guide device 22, which is suitable for guiding the belt 8, is provided in the radial direction within the wrap-around drive and above the belt disk 9.

This guide device 22 has a guide body 13, which carries two guide rails that are each provided, in turn, with a sliding coating 14. Of the two guide rails, one guide rail faces the inside of the slack strand and the other guide rail faces the inside of the belt 8 located in the tightened strand.

The guide rails are arranged with their sliding coating 14 at a slight distance from the belt 8, such that an approximately funnel-shaped guide channel 23, 24 for the belt 8 is formed between the sliding coating 7 of the guide body 5 of the additional device 21 and the sliding coating 14 of the guide body 13 or between the sliding coating 3 of the guide body 2 of the first tensioning device 20 and the sliding coating 14 of the guide body 13.

The guide channel 23 prevents, for example, on the slack strand side that a lengthened belt 8 caused by wear can lift so far from the belt disk 9 that the belt jumps from the teeth when tension on the belt 8 falls due to decreasing application of force by the first tensioning device 20. The other guide channel 24 generates the same effect on the tightened strand side of the driving belt disk 9, where tooth jumping caused by the belt 8 being held back is prevented. In addition, in this way the production of transverse vibrations in the belt 8 is advantageously prevented or at least advantageously reduced.

However, the guide rails of the guide device 22 can also be arranged with the sliding coatings 14 such that they are located in constant contact with the belt 8. It is also possible that the additional guide device 22 located in the radial direction inside the wrap-around drive is arranged at a different position in the radial direction inside of the wrap-around drive, or other guide devices are provided in the radial direction inside the wrap-around drive.

It is also possible that only one guide device 22 or several guide devices each with only one guiding surface allocated to the belt 8 are arranged in the radial direction inside the wrap-around drive.

The guide body 13 of the guide device 22 can be connected mechanically in another variation to one of the two other guide bodies 2 or 5 or also to both guide bodies 2 and 5 in a suitable way.

Figure 2:
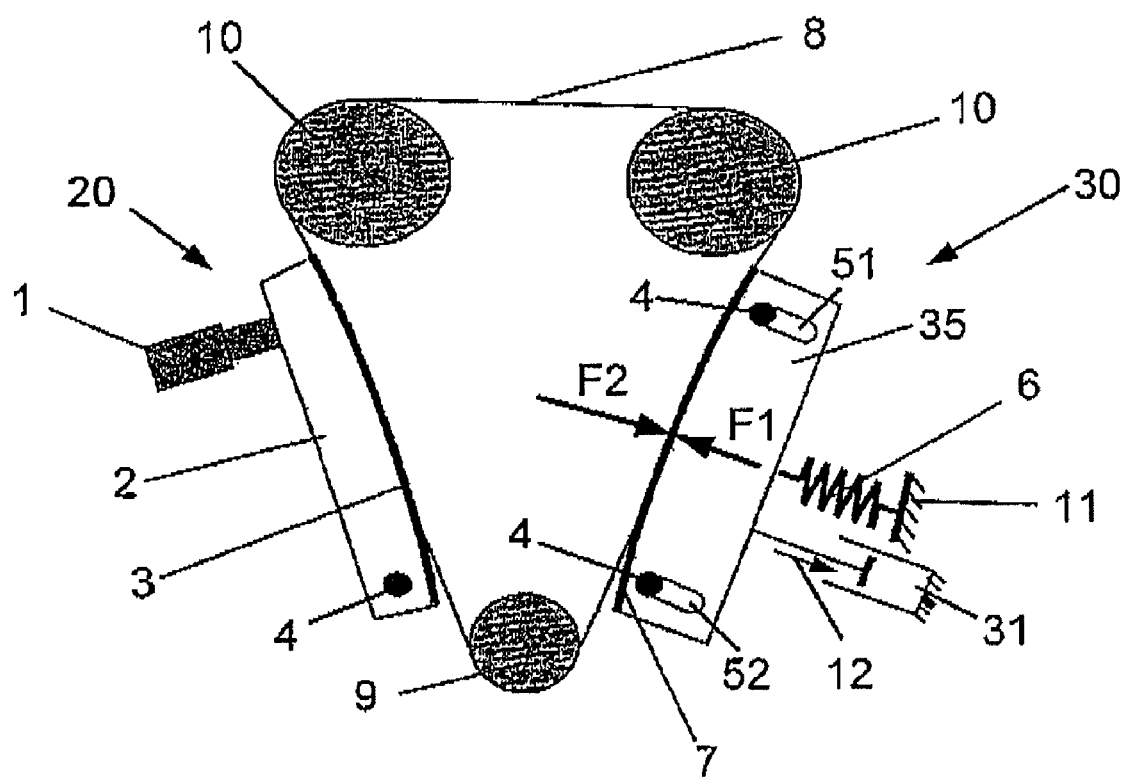

FIG. 2 likewise shows a wrap-around drive of an internal combustion engine with a circulating traction means constructed as a belt 8 and connecting a driven wheel and at least one drive wheel. In the present case, the drive of the belt disk 9 is transmitted by the belt 8 to the two belt disks 10. In the slack strand, in turn, a first tensioning device 20 composed of a tensioner 1 that can be activated by pressurized medium and a guide body 2 with a sliding coating 3 is arranged.

On the tightened strand, there is a second tensioning device 30 with a guide body 35 featuring a sliding coating 7. The guide body 35 is acted upon by a spring 6 with a force, wherein the spring attachment 11 can be realized on a stationary part, for example, on the housing of the internal combustion engine. In addition, a piston-cylinder arrangement 31 is connected to the guide body 35 and to the housing of the internal combustion engine, such that the guide body 35 of this second tensioning device 30 can be moved away from the belt 8 against the contact force of the spring 6.

To enable the movement of the guide body 35 of this second tensioning device 30, this also features two elongated recesses 51 and 52, which are aligned in the direction toward the tightened strand of the belt 8 and which are intersected by two attachment points 4 constructed as stay bolts, so that the guide body 35 is arranged so that it can move in the direction toward the belt 8.

During operation of the internal combustion engine, a sufficiently large pressurized medium pressure is generated, which is led to the tensioner 1 of the first tensioning device 20 and to the piston-cylinder arrangement 31 of the second tensioning device 30. Therefore, the first tensioning device 20 presses against the belt 8 in order to tension the belt, while the piston-cylinder arrangement 31 of the second tensioning device 30 is acted upon with oil pressure 12, such that the guide body 35 lifts from the belt 8 in a friction-reducing way against the force of the spring 6 or contacts the belt 8 at least with low force in a guiding manner on this belt strand.

If the internal combustion engine is turned off and thus there is no more pressurized medium available for the tensioner 1 or for the piston-cylinder arrangement 31, then the tensioner 1 of the first tensioning device 20 also cannot tension the belt 8. Now if the belt 8 becomes longer than its installed dimension due to wear, this leads to a belt 8 suspended in the wrap-around drive that is overall only relatively looser without additional means. Now if the internal combustion engine is started again, undesired tooth jumping can occur on the drive disk 9 and/or on the driven disks 10, which would lead to phase or rotational angle errors of the shafts in this wrap-around drive.

Because the piston-cylinder arrangement 31 of the second tensioning device 30 for a deactivated drive motor or for no or insufficient pressurized medium pressure does not generate a counter force overcoming the force of the spring 6, the spring 6 presses the guide body 35 against the belt 8 just with this spring force F1, so that the belt is also tensioned in this operating position and tooth jumping is reliably prevented.

In contrast, for an activated drive motor, that is, during operation of the belt 8, sufficient oil pressure 12 for the tensioner 1 that can be activated by pressurized medium is generated, which acts against the spring force F1 of the spring 6 with a force F2 on the belt 8 or the second tensioning device 30 arranged in the slack strand, which is greater than the spring force F1. Therefore, the guide body 35 is pressed outward until, as FIG. 2 shows, the attachment points 4 constructed as stay bolts are located at the left stop of the recesses 51, 52 in the guide body 35 of the second tensioning device 30.

Figure 3:
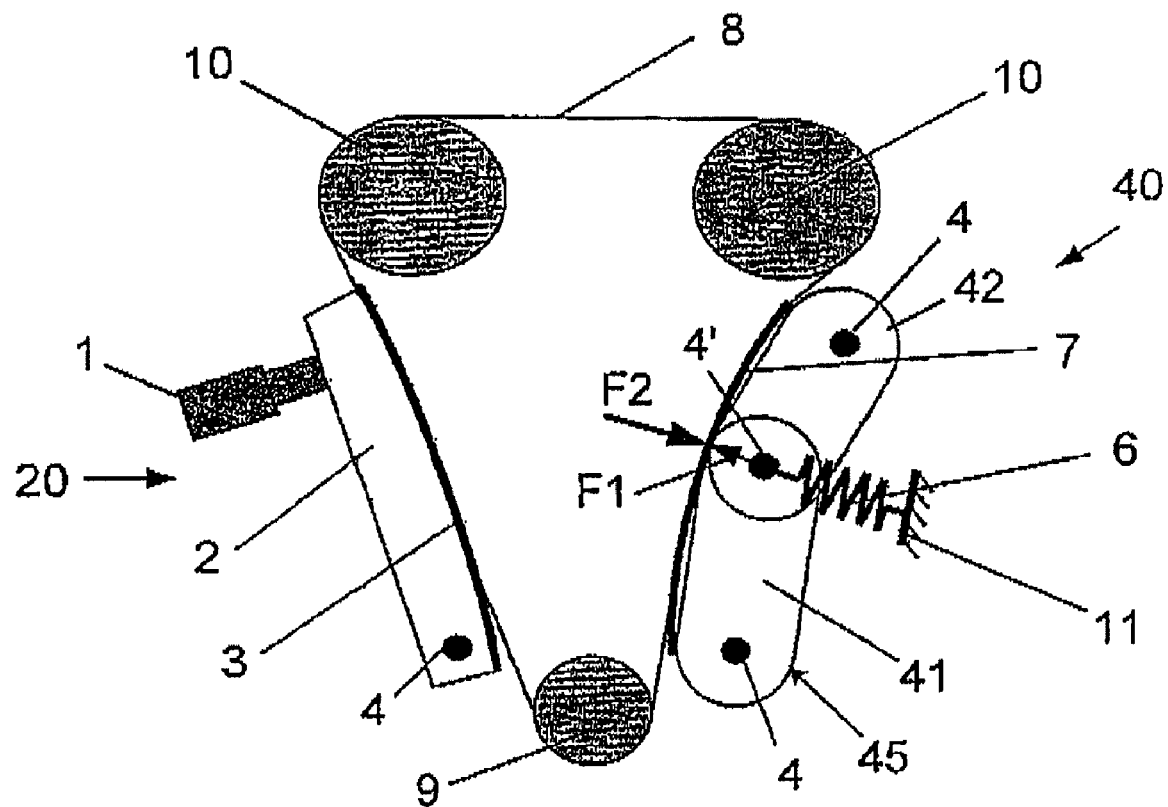

In contrast to FIG. 2, FIG. 3 shows a wrap-around drive, in which the guide body 45 of a second tensioning device 40 provided in the slack strand has a deformable construction. For this purpose, in this embodiment the guide body 45 has a two-part construction, wherein this is fixed so that it can pivot on attachment points 4 at the ends of its longitudinal extent. The two individual parts 41 and 42 of the multiple-part guide body 45 are connected to each other so that they can pivot in a middle region of this body at an attachment point 4'. A spring 6, which is fixed in position on the motor housing, for example, with its other end, also engages to this attachment point 4'. For this embodiment, the spring force F1 generated by the spring 6 and acting in the direction toward the belt 8 is also smaller than the force F2 generated by the first tensioning device 20 and acting on the guide body 45 via the belt 8 in the activated drive motor.

Figure 4:
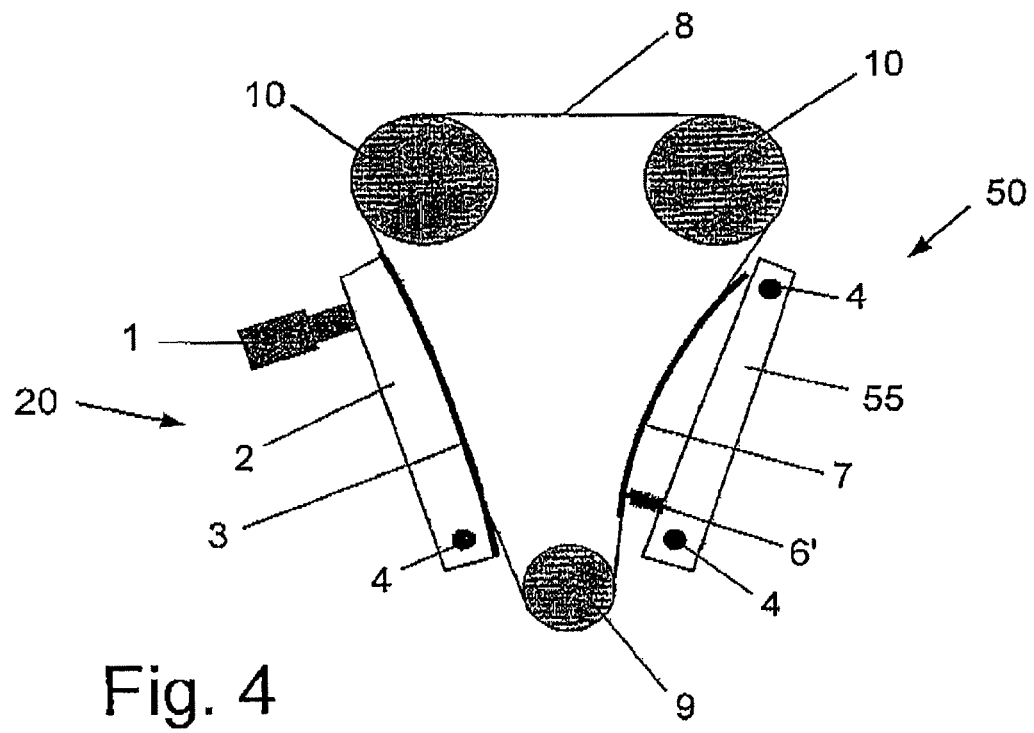

The wrap-around drive shown in FIG. 4 has, in contrast to the variant according to FIG. 2, in the tightened strand a second tensioning device 50, in which the one-part guide body 55 is fixed to two end-side attachment points 4 and in which a spring 6' is arranged between the sliding coating 7 and the guide body 55. The term sliding coating is understood in this connection not as a coating of a body but instead the body itself, which is in contact with the belt 8 in a spring-loaded manner.

Figure 5:
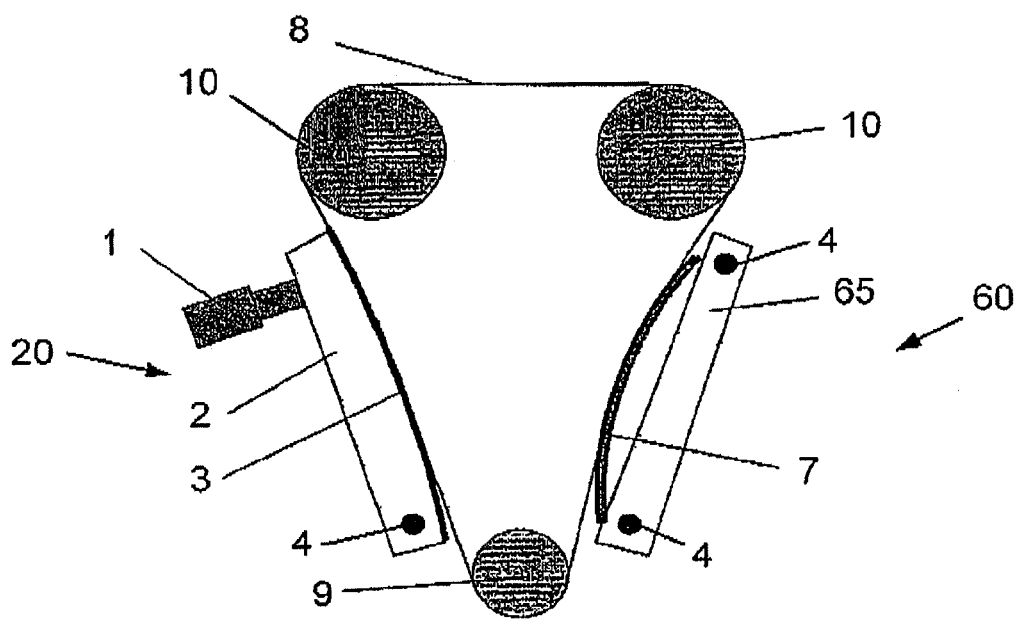

However, this so-called sliding coating 7 itself (as shown in FIG. 5) can also have a spring-elastic, for example, leaf spring-shaped construction, which is supported on the end on a guide body 65 according to the second tensioning device 60 shown there. This guide body 65 is here fixed to the housing also at two attachment points 4. For the wrap-around drives shown in FIG. 4 or FIG. 5, the spring force F1 generated by the spring 6' or the spring-elastic sliding coating 7 itself in the direction toward the belt 8 is also smaller than the force F2 generated by the tensioner 1 of the first tensioning device 20 that can be activated by pressurized medium and guided by the belt 8 to the guide body 55 or 65.

Figure 6:
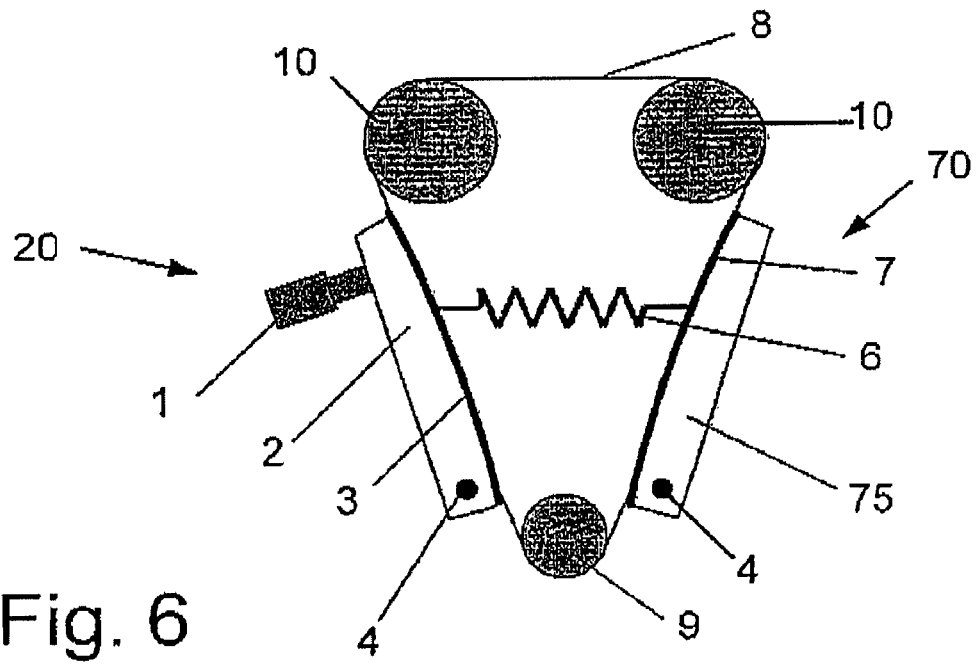

In contrast to the embodiment according to FIG. 2, FIG. 6 shows a wrap-around drive with a second tensioning device 70, in which a guide body 75 of this second tensioning device 70 provided on the tightened strand is hinged so that it can pivot via an attachment point 4 only in a lower region pointing toward the drive element 9. In addition, the two tensioning devices 20, 70 arranged in the slack strand and tightened strand, respectively, are connected elastically to each other via a spring 6. Therefore, it is achieved that the belt 8 is acted upon with a basic tension that overcomes belt slack that is too much independent of the pressure supply for the tensioner 1 that can be activated by pressurized medium both in the slack strand and also in the tightened strand.

For an internal combustion engine during operation, pressurized medium under sufficient operating pressure is generated for the tensioner 1, so that this tensions a belt 8 compensating for belt slack caused by wear. The spring 6 between the first tensioning device 20 and the second tensioning device 70 also generates in this operating phase a contact force, with which the guide body 75 is pressed against the belt 8.

If the pressure supply for the tensioner 1 that can be activated by pressurized medium is interrupted, this definitely leads to a restoring motion of the guide body 2 of the first tensioning device 20 away from the belt 8, because the spring 6 is pulled along for this restoring movement but with its end fixed to this guide body 2, the force at least of the guide body 75 of the second tensioning device 70 on the belt 8 remains at least the same size. An undesired large belt slack, as well as tooth jumping in the wrap-around drive, is reliably prevented.

Figure 7:
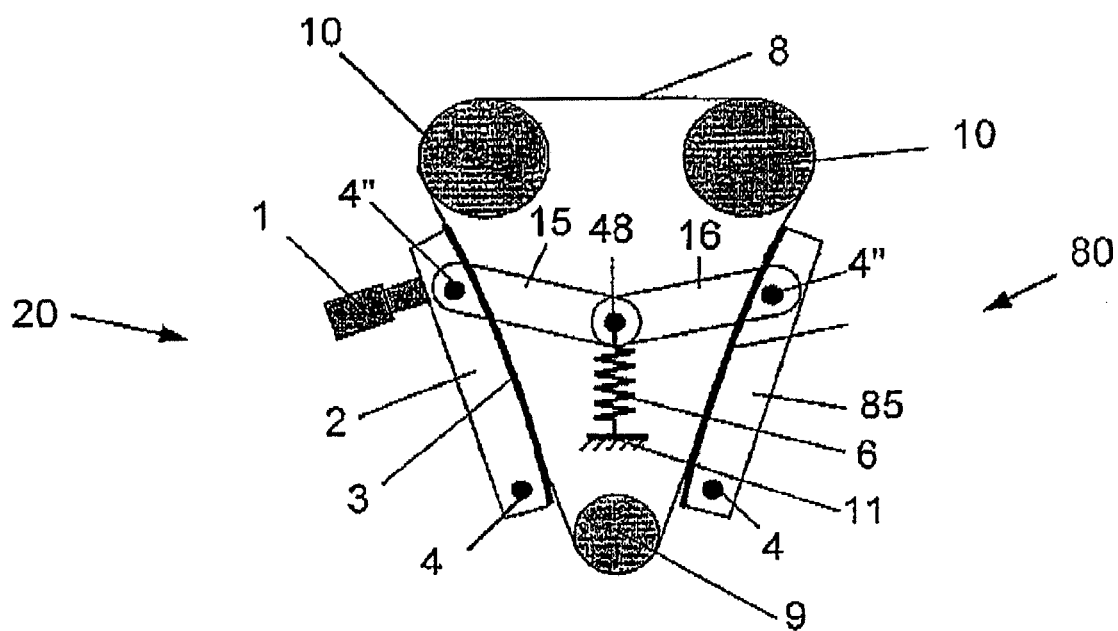

In FIG. 7, in a modification to the embodiment according to FIG. 6, a wrap-around drive is shown, in which a lever-like connection element 15 or 16 is hinged to a corresponding attachment point 4" on the guide bodies 2 and 85 of the two tensioning devices 20 and 80 arranged on the slack strand or tightened strand in their region pointing away from the drive element 9. These connection elements 15 or 16 are connected to each other in an articulated manner with their other end at a connection point 48. In turn, a spring 6, whose spring force acts on the guide body 2 or 5 through the use of the lever-like connection elements 15 or 16 for approximately the same parts, engages at this connection point 48. This happens in that the belt 8 is acted upon with a basic tensioning force that tensions a slack belt 8 for no compressed-means supply for the tensioner 1 independent of the tensioner 1 that can be activated by pressurized medium both in the slack strand and also in the tightened strand. In the operating behavior, that is, for an activated or deactivated pressure supply for the tensioner 1, these two tensioning devices 20 and 80 according to FIG. 7 act like the two tensioning devices 20 and 70 according to FIG. 6.

Figure 8:
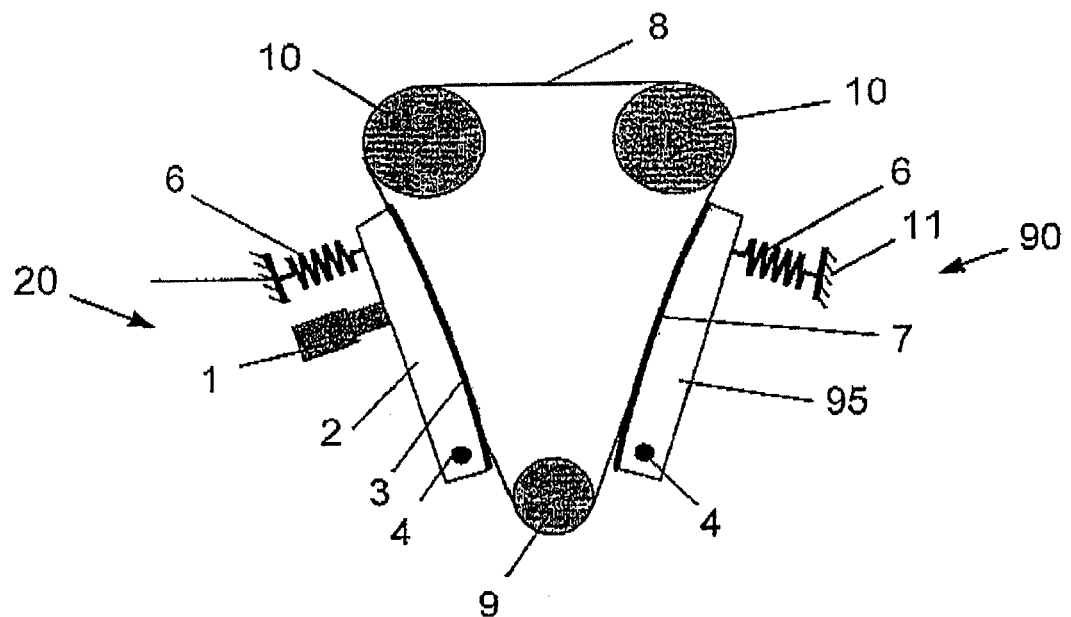

In contrast to the embodiment according to FIG. 6, in the wrap-around drive shown in FIG. 8, the guide body 2, 95 of the two tensioning devices 20 and 90 are each acted upon by a spring 6 with a spring force. In this way, it is also achieved that the belt 8 is acted upon with a spring-generated basic tensioning force independent of an activation force of the tensioner 1 that can be activated by pressurized medium both in the slack strand and also in the tightened strand. Here, for a stopped pressurized medium supply for the tensioner 1, the guide bodies 2 and 95 each press onto the belt 8 via an associated spring 6, so that tooth jumping of the belt means 8 is prevented, compensating for too much undesired belt slack.

Figure 9:
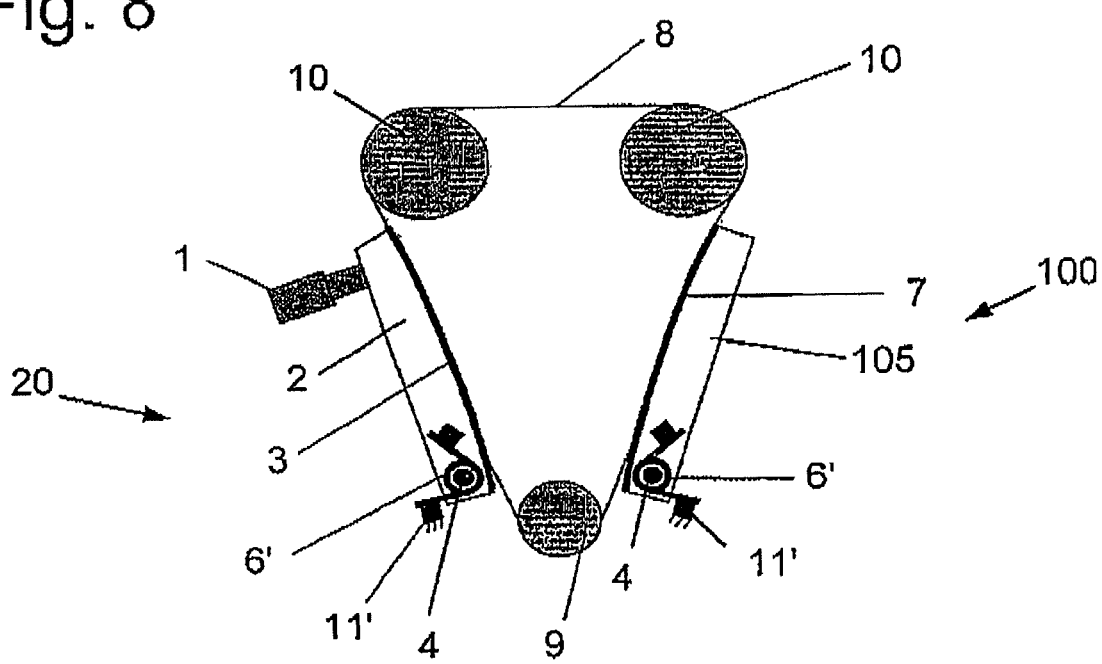

Deviating from the embodiment according to FIG. 6, in the wrap-around drive shown in FIG. 9, the guide bodies 2 and 105 supported so that they can pivot on one side at the attachment points 4 in the two tensioning devices 20 and 100 each act with a spring force on their lower end close to the drive wheel through torsion springs 6' constructed as leg springs. The torsion springs 6' are here supported against stationary spring attachment points 11'. In this way, it is also achieved that the belt 8 is acted upon with a basic tensioning force independent of the tensioner 1 that can be activated by pressurized medium both in the slack strand and also in the tightened strand. Belt lengthening caused by wear is compensated in this way and also, finally, rotational angle errors between the shafts rotating in the wrap-around drive are prevented.

As the embodiments according to FIGS. 6 to 9 make clear, also for these embodiments, during operation of the belt means or when pressure is applied to the tensioner 1 that can be activated by pressurized medium, a force F1 acts via the second tensioning device 30, 40, 50, 60, 70, 80, 90, 100 on the belt means 8, with this force being smaller than the force F2 that the belt means 8 itself exerts during operation on these second tensioning devices 30, 40, 50, 60, 70, 80, 90, 100.

The second tensioning devices 40, 50, 60, 70, 80, 90, and 100 according to FIGS. 3 to 9 can also be equipped with a piston-cylinder arrangement 31 according to FIG. 2, which presses such a second tensioning device away from the belt 8, reducing friction, when during operation of the drive motor, a sufficiently high pressurized medium pressure is provided for the tensioner 1 that can be activated by pressurized medium in the first tensioning device 20, so that this can reliably tension a non-tensioned belt means 8 that becomes too loose in the wrap-around drive (not shown).

LIST OF REFERENCE SYMBOLS

1 Tensioner that can be activated by pressurized medium
2 Guide body of slack strand
3 Sliding coating of guide of slack strand
4 Attachment point
4' Attachment point, hinge point
4" Attachment point
5 Guide body on guide body
6 Spring
6' Torsion spring
7 Sliding coating or surface of guide body
8 Belt, belt means
9 Drive element, belt disk on crankshaft
10 Drive element, belt disk on camshaft
11 Spring attachment
11' Spring attachment
12 Oil pressure
13 Guide body of inner guide device
14 Sliding coating of guide of inner guide device
15 Connection element
16 Connection element
20 First tensioning device
21 Second device, second tensioning device
22 Guide device
23 Guide channel
24 Guide channel
30 Second tensioning device
31 Piston-cylinder arrangement
35 Guide body
40 Second tensioning device
41 Individual part of guide body 40
42 Individual part of guide body 40
45 Guide body
48 Connection point
50 Second tensioning device
51 Recess of guide body
52 Recess of guide body
55 Guide body
60 Second tensioning device
65 Guide body
70 Second tensioning device
75 Guide body
80 Second tensioning device
85 Guide body
90 Second tensioning device
95 Guide body
100 Second tensioning device
105 Guide body
F1 Force of second tensioning device on belt means
F2 Force of belt means during its operation on second tensioning device

The invention claimed is:

1. Wrap-around drive, comprising a circulating belt means, which is driven by at least one drive element and which drives at least one driven element, at least one first tensioning device acting on the belt means on a slack strand of the wrap-around drive in an area between where the belt means leaves the drive element in a belt means circulating direction and reaches a closest driven element, and at least one second device acting on a tightened strand of the wrap-around drive in an area located between where the belt means reaches the drive element in the circulating direction and leaves the closest driven element, the second device is constructed for guiding the belt means and there is at least one third device, which is stationary and is arranged in a radial direction inside the wrap-around drive and which is also suitable for limiting excursions of the belt means, the at least one third device including first and second guide rails located opposite each other, the first guide rail is located on an opposite side of the belt means from the first tensioning device, in a directly opposing position forming a first guide channel therebetween for the slack strand which is adapted to contact the first tensioning device and the first guide rail, and the second guide rail is located on an opposite side of the belt means from the second device, in a directly opposing position forming a second guide channel therebetween for the tightened strand which is adapted to contact the second device and the second guide rail.

2. Wrap-around drive according to claim 1, wherein the at least one third device is provided in a region of the drive element.

3. Wrap-around drive according to claim 1, wherein the at least one third device is arranged at a defined distance from an inside of the belt means.

4. Wrap-around drive according to claim 1, wherein the at least one third device is connected mechanically to at least one of the at least one first tensioning device or to the at least one second device.

5. Wrap-around drive according to claim 1, wherein at least one of the first tensioning device, the second device or the third device is provided with a surface for reducing friction.

6. Wrap-around drive according to claim 1, wherein the third device is located entirely inside the wrap-around drive.

* * * * *